United States Patent [19]

Moriyama et al.

[11] 4,012,365
[45] Mar. 15, 1977

[54] FIBER-FORMING POLYAMIDES FROM NAPHTHALENE-2,7-DICARBOXYLIC ACID AND ALIPHATIC DIAMINE

[75] Inventors: Keiichi Moriyama; Shoji Kawase; Takeo Shima, all of Iwakuni, Japan

[73] Assignee: Teijin Limited, Osaka, Japan

[22] Filed: Oct. 15, 1974

[21] Appl. No.: 515,048

[30] Foreign Application Priority Data

Oct. 19, 1973 Japan .............................. 48-116760

[52] U.S. Cl. .................... 260/78 R; 260/33.4 R; 260/78 A; 260/78 L
[51] Int. Cl.² ........................................ C08G 69/26
[58] Field of Search ................................ 260/78 R

[56] References Cited

UNITED STATES PATENTS 2,296,555  9/1942  Hubert et al. .................. 260/78 R

OTHER PUBLICATIONS

Chemical Abstracts, vol. 68, 1968, 22670z.

*Primary Examiner*—Harold D. Anderson
*Attorney, Agent, or Firm*—Sherman & Shalloway

[57] ABSTRACT

Fiber-forming polyamides are prepared by poly-condensing naphthalene-2,7-dicarboxylic acid and a straight-chain aliphatic diamine containing 4 to 13 carbon atoms and 15 to 50 mol% of another carboxylic acid and/or another diamine as a copolymerizing component.

11 Claims, No Drawings

FIBER-FORMING POLYAMIDES FROM NAPHTHALENE-2,7-DICARBOXYLIC ACID AND ALIPHATIC DIAMINE

This invention relates to copolyamides, and more specifically, to copolyamides which are transparent and have superior resistance to alcohol.

Known polyamides such as nylon 6 or nylon 66 are tough and have excellent mechanical properties and excellent resistance to widespread organic solvents such as alcohols although soluble in a limited number of organic solvents such as formic acid or cresol. However, the above conventional polyamides are non-transparent because of their high crystallinity, and cannot be used in applications which require transparency.

In order to obtain transparent polyamides, attempts were previously made, for example, (1) to inhibit the crystallization of polyamide by quenching or adding an alkali metal salt of a higher fatty acid; (2) to form a copolyamide (for example a nylon 6 or nylon 66 copolymer); and (3) to form asymmetric polyamides (for example, polyhexamethylene isophthalamide). However, polyamides obtained by method (1) are insufficiently transparent so that thick sheets made from them are not transparent. Moreover, since they are crystallized by heat-treatment, they do not have satisfactory transparency. The polyamides obtained by methods (2) and (3) have low melting points and heat distortion temperatures therefore, their heat resistance is insufficient, and they are susceptible to attack by various chemicals. In particular, they have increased water absorption, become soluble in alcohols, and have markedly reduced mechanical properties.

Accordingly, it is an object of this invention to provide polyamides which are transparent while retaining their high melting points and softening points and excellent solvent resistance, especially excellent resistance to alcohols.

As a result of our investigations on methods for preparing transparent polyamides free from these defects, we have found that by polycondensing naphthalene-2,7-dicarboxylic acid and a straight-chain aliphatic diamine containing 4 to 13 carbon atoms using a specific proportion of another aromatic carboxylic acid, aliphatic dicarboxylic acid, aminocarboxylic acid or another diamine as a comonomer, there can be obtained a polyamide having a high softening point or melting point, excellent solvent resistance (especially, alcohol resistance), and transparency.

According to this invention, there are provided copolyamides which are prepared by polycondensing (A) naphthalene-2,7-dicarboxylic acid and/or its amideforming derivative, (B) a straight-chain aliphatic diamine containing 4 to 13 carbon atoms, and (C) a copolymer component which forms an amide on reaction with said component (A) or (B) until a fiber-forming polymer is formed; wherein said component (C) is 15 to 50 mol%, based on the total acid component or diamine component used, of at least one member selected from the group consisting of (a) at least one carboxylic acid component selected from the group consisting of aliphatic dicarboxylic acids, cyclo-aliphatic dicarboxylic acids, aromatic dicarboxylic acids other than the naphthalene-2,7-dicarboxylic acid, aminocarboxylic acids and the amide-forming derivatives thereof, (b) at least one diamine component other than straight-chain aliphatic diamines containing 4 to 13 carbon atoms, and (c) at least one diamine component which is a straight-chain aliphatic diamine containing 4 to 13 carbon atoms other than that used as component (B), and wherein the proportion of the amino or corresponding amide-forming groups in the total reaction components are equimolar to that of the carboxyl group or corresponding amide-forming groups.

The carboxylic acid component used in the preparation of copolyamides by the process of this invention should contain 50 to 100 mol%, preferably 60 to 85 mol% of naphthalene-2,7-dicarboxylic acid and/or its amide-forming derivative, and the diamine component should contain 50 to 100 mol%, preferably more than 75 mol%, of one straight-chain aliphatic diamine containing 4 to 13 carbon atoms. However, one or both of the carboxylic acid component and the diamine component need to contain another carboxylic acid and/or diamine as a copolymer component in an amount such that the sum total of the proportions of the copolymer components is 15 to 50 mol%, preferably 20 to 40 mol%, based on the total carboxylic acid component or the total diamine component.

The amounts of the components (A), (B), (a), (b) and (c) must satisfy the following relation.

$$\frac{l}{l+x} \times 100 = 50\text{--}100 \text{ mol}\%$$

$$\frac{m}{m+y+z} \times 100 = 50\text{--}100 \text{ mol}\%$$

$$\frac{x}{l+x} \times 100 + \frac{y}{m+y+z} \times 100 + \frac{z}{m+y+z} \times 100 = 15\text{--}50 \text{ mol}\%$$

wherein $l$ is the amount in mols of naphthalene-2,7-dicarboxylic acid as a main acid component (A); $m$ is the amount in mols of a straight-chain aliphatic diamine containing 4 to 13 carbon atoms as main diamine component (B); $x$ is the amount in mols of copolymer acid component (a); $y$ is the amount in mols of copolymer diamine component (b); and $z$ is the amount in mols of the other copolymer diamine component (c).

The amide-forming derivatives of naphthalene-2,7-dicarboxylic acid may, for example, be its mono- and dialkyl esters such as mono- and di-methyl esters, mono- and di-ethyl esters and mono- and di-propyl esters; its mono- and di-aryl esters; its mono- and di-acid halides; and its mono- and di-acid amides.

Examples of the aliphatic or cyclo-aliphatic dicarboxylic acids to be copolymerized are alkylene-dicarboxylic acids such as succinic acid, adipic acid, azelaic acid, sebacic acid, decanedioic acid, undecanedioic acid, dodecanedioic acid, -methyladipic acid, or $\alpha,\alpha$-dimethyladipic acid, and cycloaliphatic dicarboxylic acids such as hexahydroterephthalic acid.

Examples of the aromatic dicarboxylic acids to be copolymerized are terephthalic acid, isophthalic acid, methylterephthalic acid, 4-methylisophthalic acid, naphthalene-2,6-dicarboxylic acid, naphthalene-1,4-dicarboxylic acid, and 4,4-diphenyldicarboxylic acid.

Instead of the above aliphatic dicarboxylic acid or aromatic dicarboxylic acid copolymer component, an amide-forming derivatives thereof can be used. Examples of the derivative include a mono- or di-alkyl ester, such as a mono- or di-methyl, ethyl or propyl ester, of such dicarboxylic acid; a mono- or di-aryl ester thereof;

a mono- or di-acid halide thereof; and a mono-or di-acid amide thereof.

Examples of aminocarboxylic acids to be copolymerized include aliphatic ω-aminocarboxylic acids such as ω-aminocaproic acid, ω-aminoethanthic acid, ω-aminocaprylic acid, ω-aminopelargonic acid, ω-aminoundecanoic acid, or ω-aminolauric acid; aminocarboxylic acids containing an alicyclic group such as aminomethylcyclohexylcarboxylic acid; and aromatic aminocarboxylic acids such as p-aminobenzoic acid, m-aminobenzoic acid, 1-amino-2-naphthoic acid, 6-amino-2-naphthoic acid or 8-amino-1-naphthoic acid. Instead of the above aminocarboxylic acid copolymer component, an amide-forming derivative thereof can be used. The derivative may, for example, be a lactam thereof such as caprolactam, enantholactam, capryllactam, pelargolactam, undecalactam or laurolactam; an alkyl ester thereof; or an aryl ester thereof.

The naphthalene-2,7-dicarboxylic acid and/or its amide-forming derivative accounts for 50 to 100 mol%, preferably 60 to 85 mol% of the total carboxylic acid component. If the amount of the naphthalene-2,7-dicarboxylic acid and/or its amide-forming derivative is less than 50 mol%, the resulting polyamide has a reduced melting point or softening point. Not only is its heat resistance reduced, it also becomes easily soluble in organic solvents, especially in alcohols. Therefore, amounts outside the above-specified range are not preferred.

Examples of the straight-chain aliphatic diamine containing 4 to 13 carbon atoms which is used as an essential component in preparing polyamides in accordance with the present invention include straight-chain alkylene diamines such as tetramethylene diamine, pentamethylene diamine, hexamethylene diamine, heptamethylene diamine, octamethylene diamine, nonamethylene diamine, decamethylene diamine, undecamethylene diamine, dodecamethylene diamine or tridecamethylene diamine.

At least one of the diamines exemplified above can be used also as a copolymer component.

Examples of the other diamines used as a copolymer component are straight-chain aliphatic diamines containing not more than 3 carbon atoms such as ethylene diamine or propylene diamine, a straight-chain aliphatic diamine containing not less than 14 carbon atoms such as hexadecamethylene diamine; branched-chain aliphatic diamines such as 2,2,4-trimethyl hexamethylene diamine or 2,4,4-trimethyl hexamethylene diamine; and alicyclic diamines such as metaxylylene diamine. These diamine copolymer components may be used individually or a mixture of two or more.

The copolymer diamine component should be used in an amount of 15 to 50 mol%, preferably 20 to 40 mol% based on the total diamine component. If a diamine containing not more than 3 carbon atoms is used in an amount exceeding 50 mol% of the total diamine component, the resulting polyamide has too high a melting point, and melt polymerization or melt shaping becomes difficult. If, on the other hand, a diamine containing 14 or more carbon atoms is used in an amount exceeding 50 mol% based on the total diamine component, both the melting point and the heat resistance of the resulting polyamide are reduced. If an aliphatic diamine containing 4 to 13 carbon atoms and having side chains is used in an amount exceeding 50 mol% of the total diamine component, the crystallinity of the resulting polyamide is reduced, and therefore, its water absorption is increased with a consequent reduction in its chemical resistance.

Small amounts of additives, for example, a molecular weight adjuster, a light or heat stabilizer, an antioxidant, an antistatic agent, a pigment such as titanium oxide, or a dye may be added to the polyamide-forming materials used in this invention.

The reaction of the above dicarboxylic acid component and diamine component can be performed by any desired method known in the art of preparing polyamides. For example, the polyamides of this invention can be prepared by the following methods.

1. Melt-polymerization

A nylon salt is heated, usually at an elevated pressure, preferably in the presence of water, to form a prepolymer, and the prepolymer is heated at normal or reduced pressure to a temperature above the melting point of the polymer.

2. Interfacial or solution polymerization

An acid halide, usually acid chloride, of a dicarboxylic acid component and a diamine are dissolved separately in different solvents which will form different phases or a single homogeneous phase, and these two solutions are mixed to polymerize these monomers. For example, a diamine and an alkali compound as a de-acidifying agent are dissolved in water, and on the other hand, a diacid chloride is dissolved in methylene chloride. These solutions are mixed with agitation at high speed. The polymer precipitated is filtered, and washed with steam to remove the methylene chloride residue, followed by further washing with boiling water. The resulting polymer is then dried.

3. Solid phase polymerization (this is well known, and no illustration appear necessary)

The general description of the above-mentioned polymerization methods is described in a number of prior literature references, for example, in W. R. Sorenson, and T. W. Campbell, PREPARATIVE METHODS OF POLYMER CHEMISTRY, published by John Wiley and Sons, Inc. (1961).

It is most convenient to adopt the melt-polymerization method mentioned in (1) above. In this case, the above carboxylic acid component and the above diamine component may be charged into a polymerization vessel as such, but they may be reacted to form a salt of the carboxylic acid and the diamine before being charged. Alternatively, a polyamide is first prepared from naphthalene-2,7-dicarboxylic acid and the diamine, and then admixed in the molten state with another carboxylic acid component and another diamine, or a polyamide obtained by polycondensing the other carboxylic acids and diamine thereby to perform a reaction of these.

The polyamides obtained by the process of this invention have poor crystallinity, excellent transparency, and high heat resistance and chemical resistance, especially resistance to alcohols such as methanol, ethanol, n- and iso-propanol.

These polyamides can be melt-shaped into shaped articles including fibers and films having a high Young's modulus.

The following Examples illustrate the present invention specifically. In the following Examples, LOI (oxygen index), resistance to ethanol, specific viscosity [$\eta_{sp/c}$], and cloudiness were measured by the following methods 1. LOI (oxygen index)

Measured in accordance with the method of ASTM D-2863.

2. Resistance to ethanol

The appearance of a test sample was tested in accordance with the method of ASTM D-543-67, and evaluated on the following scale.

O — No change in appearance after immersion for 7 days x — Swollen, became cloudy, or dissolved after immersion for 7 days 3. [$\eta_{sp/c}$]

400 mg of a polymer was dissolved in 100 cc of conc. sulfuric acid at 80° C. over the course of 1 hour. The solution was cooled, and then the viscosity was measured at 35° C.

4. Cloudiness

Measured in accordance with the method of ASTM D-1003-61.

EXAMPLES 1 TO 3 AND COMPARATIVE EXAMPLE 1

Equimolar proportions of hexamethylene diamine and naphthalene-2,7-dicarboxylic acid were dissolved in water to form a salt, and then methyl alcohol was poured into the solution to form a white powder of hexamethylene diammonium naphthalene-2,7-carboxylate (abbreviated as 6-N salt). The salt did not contain water of crystallization.

The 6-N salt and hexamethylene diammonium isophthalate (abbreviated as 6-I salt) were charged in the proportions shown in Table 1 and polymerized.

An autoclave equipped with a stirrer was charged with 1 mol in total of the 6-N salt and the 6-I salt, 0.005 mol of phosphorous acid (stabilizer) and 0.01 mol of sebacic acid (for adjusting the degree of polymerization), and after being purged with nitrogen, sealed. Then, the internal pressure of the autoclave was reduced to normal atmospheric pressure over the course of 1 hour, during which time the temperature was raised to 290° C. After the pressure release was over, a purified nitrogen gas was passed through the autoclave at a rate of 1 liter/min., and the contents were heated at 290° C. for 1 hour with stirring to complete the polymerization. The resulting polymer was discharged from the bottom of the autoclave, and cooled and solidified in water. The properties of the resulting polymers are shown in Table 1.

EXAMPLES 4 AND 5

The procedure of Examples 1 to 3 was repeated except that hexamethylene diammonium adipate (abbreviated as 66 salt) was used instead of the 6-I salt used in Examples 1 to 3 and the 6-N salt and 66 salt were polymerized in the proportions shown in Table 2. The properties of the resulting polymers are shown in Table 2.

Table 2

|  | Example 4 | Example 5 |
|---|---|---|
| Starting materials |  |  |
| 6-N salt (mols) | 0.80 | 0.60 |
| 66 salt (mols) | 0.20 | 0.40 |
| Vicat softening point (° C.) | 146 | 127 |
| [$\eta_{sp/c}$] | 0.87 | 0.97 |
| Crystallinity | none | none |
| Resistance to ethanol | 0 | 0 |

EXAMPLES 6 AND 7

The procedure of Examples 1 to 3 was repeated except that ε-caprolactam (abbreviated as lactam) was used instead of the 6-I salt used in Examples 1 to 3, and the 6-N salt and lactam were polymerized in the proportions shown in Table 3. The properties of the polymers obtained are shown in Table 3.

Table 3

|  | Example 6 | Example 7 |
|---|---|---|
| Starting materials |  |  |
| 6-N salt (mols) | 0.80 | 0.60 |
| ε-caprolactam (mols) | 0.20 | 0.40 |
| Vicat softening point (° C.) | 142 | 110 |
| [$\eta_{sp/c}$] | 0.91 | 1.11 |
| Crystallinity | none | none |
| Resistance to ethanol | 0 | 0 |

EXAMPLES 8 AND 9

The procedure of Examples 1 to 3 was repeated except that hexamethylene diammonium terephthalate (abbreviated as 6-T salt) was used instead of the 6-I salt used in Examples 1 to 3, and the 6-N salt and 6-T salt were polymerized in the proportions shown in Table 4. The properties of the resulting polymers are shown in Table 4.

Table 4

|  | Example 8 | Example 9 |
|---|---|---|
| Starting materials |  |  |
| 6-N salt (mols) | 0.80 | 0.60 |
| 6-T salt (mols) | 0.20 | 0.40 |
| Vicat softening point (° C.) | 170 | 155 |
| $\eta_{sp/c}$ | 1.02 | 1.10 |
| Crystallinity | none | none |

Table 1

|  | Example 1 | Example 2 | Example 3 | Comparative Example 1 |
|---|---|---|---|---|
| Starting materials |  |  |  |  |
| 6-N salt (mols) | 0.90 | 0.80 | 0.60 | 1.00 |
| 6-I salt (mols) | 0.10 | 0.20 | 0.40 | 0 |
| Vicat softening point (° C.) | 163 | 161 | 154 | 158 |
| [$\eta_{sp/c}$] | 0.98 | 0.93 | 1.06 | 0.95 |
| Second order transition point (° C.) | 138 | 140 | 129 | 131 |
| Crystallinity | none | none | none | crystalline |
| Resistance to ethanol | 0 | 0 | 0 | * |

* The polymer was already cloudy before testing because of the crystallization of the polymer.

Table 4-continued

| | Example 8 | Example 9 |
|---|---|---|
| Resistance to ethanol | 0 | 0 |

EXAMPLES 10 TO 12

The procedure of Examples 1 to 3 was repeated except that a salt formed between hexamethylene diamine and dodecanedioic acid (abbreviated as 6-12 salt) was used instead of the 6-I salt used in Examples 1 to 3, and the 6-N salt and 6-12 salt were polymerized in the proportions shown in Table 5. The properties of the polymers obtained are shown in Table 5.

Table 5

| | Example 10 | Example 11 | Example 12 |
|---|---|---|---|
| Starting material | | | |
| 6-N salt (mols) | 0.90 | 0.80 | 0.60 |
| 6-12 salt (mols) | 0.10 | 0.20 | 0.40 |
| Vicat softening point (° C.) | 135 | 120 | 113 |
| $\eta_{sp/c}$ | 0.90 | 0.99 | 1.05 |
| Crystallinity | none | none | none |
| Resistance to ethanol | 0 | 0 | 0 |

EXAMPLES 13 AND 14

The procedure of Examples 1 to 3 was repeated except that a salt formed hexamethylene diamine and sebacic acid (abbreviated as 6-10 salt) was used instead of the 6-I salt. The properties of the resulting polyamides are shown in Table 6.

Table 6

| | Example 13 | Example 14 |
|---|---|---|
| Starting materials | | |
| 6-N salt (mols) | 0.80 | 0.60 |
| 6-10 salt (mols) | 0.20 | 0.40 |
| Vicat softening point (° C.) | 132 | 115 |
| $\eta_{sp/c}$ | 0.95 | 0.94 |
| Oxygen index | 25.0 | 24.5 |
| Cloudiness | 9.5 | 9.0 |
| Resistance to ethanol | 0 | 0 |

EXAMPLES 15 AND 16

The procedure of Examples 1 to 3 was repeated except that a salt formed between hexamethylene diamine and hexahydroterephthalic acid (abbreviated as 6-HTA) was used instead of the 6-I salt. The properties of the resulting polyamides are shown in Table 7.

Table 7

| | Example 15 | Example 16 |
|---|---|---|
| Starting materials | | |
| 6N (mols) | 0.80 | 0.60 |
| 6-HTA | 0.20 | 0.40 |

Table 7-continued

| | Example 15 | Example 16 |
|---|---|---|
| Vicat softening point (° C.) | 158 | 154 |
| $\eta_{sp/c}$ | 0.91 | 0.95 |
| Oxygen index | 25.7 | 25.2 |
| Cloudiness | 9.5 | 9.7 |
| Resistance to ethanol | 0 | 0 |

EXAMPLE 17 AND COMPARATIVE EXAMPLES 2 AND 3

Equimolar proportions of dodecamethylene diamine and naphthalene-2,7-dicarboxylic acid were dissolved in water, and then methanol was poured into the solution to form dodecamethylene diammonium naphthalene-2,7-dicarboxylate (12-N salt). The procedure of Examples 1 to 3 was repeated except that the 12-N salt was used instead of the 6-N salt, and hexamethylene diammonium monomethylterephthalate isophthalate (6-MTIA salt) was used instead of the 6-I salt. The properties of the resulting polyamides are shown in Table 8.

Table 8

| | Example 17 | Comparative Example 2 | Comparative Example 3 |
|---|---|---|---|
| Starting materials | | | |
| 12-N salt (mols) | 0.8 | 1.0 | 0 |
| 6-MTIA salt (mols) | 0.2 | 0 | 1.0 |
| Vicat softening point (° C) | 153 | 247 | 162 |
| $\eta_{sp/c}$ | 0.81 | 0.90 | 0.84 |
| Oxygen index | 26.5 | 27.0 | 23.0 |
| Cloudiness | 9.0 | crystalline | 9.5 |
| Resistance to ethanol | 0 | * | x |

* The polymer was already cloudy before testing because of its crystallization.

EXAMPLE 18

The procedure of Examples 1 to 3 was repeated except that hexamethylene diammonium naphthalene-2,7-dicarboxylate (6-N salt) and meta-xylylene diammonium naphthalene-2,7-dicarboxylate (MX-N salt) were used in the proportions shown in Table 9.

The properties of the resulting polyamides are shown in Table 9 below.

Table 9

| | 6-N salt/MX-N salt | |
|---|---|---|
| Moles of the nylon salts | 0.80/0.20 | 0.70/0.30 |
| Vicat softening point (° C.) | 155 | 152 |
| $\eta_{sp/c}$ | 0.81 | 0.97 |
| Oxygen index | 25.5 | 26.0 |
| Cloudiness | 9.3 | 9.4 |
| Resistance to ethanol | 0 | 0 |

What we claim is:
1. A fiber-forming polyamide consisting essentially of the polymeric reaction product of:

I. A first dicarboxylic acid selected from the group consisting of naphthalene-2,7-dicarboxylic acid and the amide-forming derivatives thereof;

II. a first straight-chain aliphatic diamine containing 4 to 13 carbon atoms; and III. a copolymer component consisting essentially of at least one of:

A. a second dicarboxylic acid selected from at least one of the group consisting of aliphatic dicarboxylic acids, cyclo-aliphatic dicarboxylic acids, aromatic dicarboxylic acids other than the first dicarboxylic acid of component I, and the amide-forming derivatives thereof; and B. a copolymer diamine component containing at least one of:
1. at least one second diamine other than those of the first diamine group of component II, and
2. at least one third aliphatic diamine having a straight-chain and containing 4 to 13 carbon atoms, other than that used as component II, with the provisos that the proportion of the amino group in the total reaction components is equimolar to that of the carboxyl group or the corresponding amide-forming group thereof, and the amounts of components I, II and III satisfy the following molar percentages:

$$\frac{l}{l+x} \times 100 \text{ is from 50 to 100 mol\%,} \quad \text{(i)}$$

$$\frac{m}{m+y+z} \times 100 \text{ is from 50 to 100 mol\%, and} \quad \text{(ii)}$$

$$\frac{x}{l+x} \times 100 + \frac{y}{m+y+z} \times 100 + \frac{z}{m+y+z} \times 100 \quad \text{(iii)}$$

is from 15 to 50 mol%, where
$l$ = amount in mols of component I,
$m$ = amount in mols of component II,
$x$ = amount in mols of component III (A),
$y$ = amount in mols of component III (B)(1), and
$z$ = amount in mols of component III (B)(2).

2. The polyamide of claim 1 wherein
i. $(l/l + x) \times 100$ is from 60 to 85 mol%.

3. The polyamide of claim 1 wherein
ii. $(m/m + y + z) \times 100$ is from 75 to 100 mol%.

4. The polyamide of claim 1 wherein
iii. $(x/l + x) \times 100 + (y/m + y + z) \times 100 + (z/m + y + z) \times 100$ is from 20 to 40 mol%.

5. The polyamide of claim 1 wherein the amide-forming derivative of component I is selected from the group consisting of mono- and dialkyl esters; mono- and diaryl esters; mono- and di-acid halides; and mono- and diacid amides.

6. The polyamide of claim 1 wherein component III (A) is selected from the group consisting of succinic acid, adipic acid, azelaic acid, sebacic acid, decanedioic acid, β-methyladipic acid, α,α-dimethyladipic acid, hexahydroterephthalic acid, terephthalic acid, isophthalic acid, methylterephthalic acid, naphthalene-1,4-dicarboxylic acid, 4,4-diphenyldicarboxylic acid, and the amide-forming derivatives thereof.

7. The polyamide of claim 6 wherein the amide-forming derivative is selected from the group consisting of mono- and dialkyl ester; mono- and diaryl ester; mono- and diacid halide; and mono- and diacid amide.

8. The polyamide of claim 1 wherein component III (B)(1) is selected from the group consisting of: straight-chain aliphatic diamines containing not more than 3 carbons; straight-chain aliphatic diamines containing not less than 14 carbons; branched-chain aliphatic diamines; and alicyclic diamines.

9. The polyamide of claim 8 wherein component III (B)(1) is selected from the group consisting of: ethylene diamine; propylene diamine; hexadecamethylene diamine; 2,2,4-trimethyl hexamethylene diamine; 2,4,4-trimethyl hexamethylene diamine; and metaxylylene diamine.

10. The polyamide of claim 1 wherein $(y/m + y + z) \times 100 + (z/m + y + z)$ is from 15 to 50 mol%.

11. The polyamide of claim 10 wherein $(y/m + y + z) \times 100 + (z/m + y + z) \times 100$ is from 20 to 40 mol%.

* * * * *